E. A. MIDGLEY.
GRADUATED LOW PRESSURE STEAM AND WATER INLET VALVE.
APPLICATION FILED JUNE 10, 1907.

907,625.

Patented Dec. 22, 1908.

WITNESSES:
J. M. Fowler Jr.
A. L. Kitchin

INVENTOR
Ephraim Andrews Midgley
By Mason Fenwick Lawrence
his ATTORNEYS.

UNITED STATES PATENT OFFICE.

EPHRAIM ANDREWS MIDGLEY, OF SALT LAKE CITY, UTAH.

GRADUATED LOW-PRESSURE STEAM AND WATER INLET VALVE.

No. 907,625.

Specification of Letters Patent.

Patented Dec. 22, 1908.

Application filed June 10, 1907. Serial No. 378,229.

*To all whom it may concern:*

Be it known that I, EPHRAIM ANDREWS MIDGLEY, citizen of the United States, residing at Salt Lake City, in the county of Salt Lake and State of Utah, have invented certain new and useful Improvements in Graduated Low-Pressure Steam and Water Inlet Valves; and I do hereby declare the following to be a full, clear, and exact description of the invention, such as will enable others skilled in the art to which it appertains to make and use the same.

This invention relates to improvements in valves and more particularly to valves for low pressure steam and hot water heating systems.

The invention comprises the production of a valve, a housing and a valve member contained therein adapted to be revolved for regulating the flow of liquid therethrough.

The invention further comprises the production of a valve having valve means for regulating the amount of the flow of liquid through the valve and an indicating finger for indicating the position of the valve in the casing.

The invention still further comprises the production of a casing adapted to receive valve means and formed with an indicating scale together with a plurality of lugs or stops for limiting the extreme position of the indicator designed to be passed over the scale.

The object in view is the production of a valve that will permit any desired amount of liquid to flow therethrough and formed with means for regulating the amount of liquid passed therethrough at any time.

Another object in view is the production of a valve member positioned within the casing and formed with any desired number of openings for permitting the passage of liquid therethrough and means secured to the valve member for indicating the position of the same on the outer surface of the casing.

With these and other objects in view, the invention comprises certain novel constructions, combinations and arrangement of parts that will be hereinafter more fully described and claimed.

Figures 1, 2:
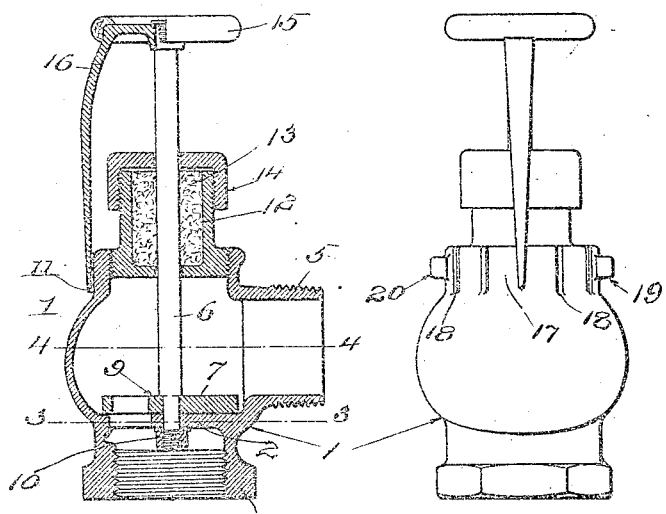
Figures 3, 4:
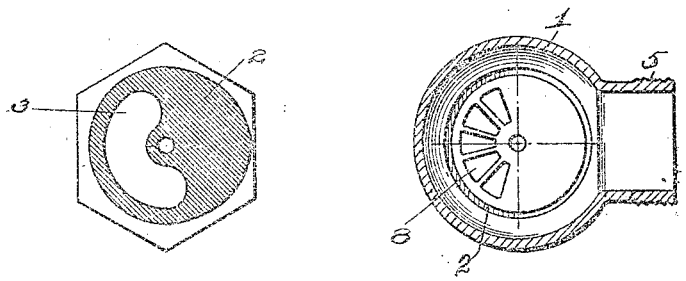

In the accompanying drawing: Figure 1 is a longitudinal vertical section through a valve formed according to the present invention. Fig. 2 is an elevation of a valve formed according to the present invention and showing an indicator and scale therefor. Fig. 3 is a section through Fig. 1 on line 3—3. Fig. 4 is a section through Fig. 1 on line 4—4.

In constructing a valve according to the present invention I provide a casing 1, formed of any desired shape and provided with a valve seat or lug 2. Valve seat 2 is formed with an opening 3 of any desired length and is preferably substantially arc shaped as seen in Fig. 3. Positioned below and formed integral with the casing is an extension 4 preferably internally screw threaded for providing means for securing the valve in position. Another projection 5 is formed above seat 2 through which the liquid is designed to pass and to which is secured a conducting pipe or other means as may be desired. Pivotally mounted in seat 2 is a valve stem or shaft 6 to which is rigidly secured a valve member 7 that is preferably formed with a plurality of openings 8, the length of the openings 8 being designed to be substantially the same as the width of opening 3. Shaft 6 is shouldered or off set at 9 so as to prevent any upward movement of valve member 7 and is screw threaded at 10 for receiving a nut or other securing means for preventing shaft 6 from leaving seat 2 in case the liquid enters from extension 4. By this structure the liquid may either enter from extension 4 or 5 as may be desired and yet valve 7 will be held against its seat 2 at all times whether apertures 8 are coinciding with apertures 3 or the solid portion of 7 is positioned above aperture 3.

Casing 1 is formed at its upper end with a screw threaded opening 11 that is substantially the same in diameter as valve member 7 so that valve member 7 may be easily inserted in the casing, or if desired, opening 11 need not be made large enough for the passage of member 7 when assembling the parts if the extension 5 is sufficiently large for the passage of valve member 7 therethrough. Secured in position in opening 11 and extending upward therefrom is a cup or packing receptacle 12 designed to hold in position packing 13 by means of any suitable cap 14. Cap 14 may be simply an ordinary cap with an aperture centrally thereof for accommodating shaft 6 or may be formed with an extension either square or inclined for pressing together packing 13 and holding the same against shaft 6. Upon the outer end of shaft 6 is an operating wheel or member 15 and also an indicating finger 16. The indicating finger 16 and member 15 are rigidly secured to shaft 6 so as to rotate therewith so that as the shaft is rotated by member 15, the finger 16 will indicate upon the scale 17 the position of valve member 7 in relation to opening 3. Scale 17 is preferably formed with indentations or slots 18 in which the lower end of finger 16 is designed to rest, and when it is desired to move valve 7 to a new position upon the rotation of the same finger 16 will leave the depression in which the same is located and pass on to any of the other depressions as may be desired. The spring of the arm or finger will permit the same to enter and leave the various depressions 18 without difficulty. Positioned at substantially opposite sides of the valve casing 1 are lugs 19 and 20 which indicate the extreme limit of travel of the valve member 7 and finger or arm 16. It will be perfectly evident that when finger 10 is against one of the stops that the valve is entirely closed and can not be further moved in a closed position without breaking finger 10, and when against the other stop it is in its extreme open position and can not be further opened or rotated in that direction.

In operation the valve is secured in position and when any desired quantity of steam or water or other liquid controlled by the valve is desired, valve member is rotated by wheel 15 and the indicator or finger 10 moves to a corresponding position to valve member 7 and indicates the amount of liquid permitted to pass through the valve. The valve seat 2 is formed with a smooth surface in any convenient manner and also valve member 7 is formed with a smooth even surface for contacting with the surface of member 2 so as to form a tight joint therebetween, for preventing the escape of steam or liquid therethrough. When used in heating, steam or hot water may be regulated by setting the valve at any desired point and as a result only a certain amount of heating medium will be permitted to pass into the heating device. The depressions or graduations 18 on scale 17 may be so arranged as to indicate approximately the temperature of the building or other place being heated so that when the valve is turned so as to have the indicating finger 16 at any particular graduation it will be known to the one operating the valve the exact effect that the same will have upon the devices being heated.

As clearly shown in Fig. 1 of the drawings, the wheel 15 is formed with a recess 15' in which is received and secured the shouldered extension 16' formed at the upper end of the indicator finger 16, the finger being in this manner secured to the wheel for rotation therewith and the shaft.

What I claim is:—

1. In a device of the class described, a valve formed with a plurality of conduit openings, a seat provided with a solid portion to cover the said openings and with an open portion adapted to register with said openings, a shaft for the valve, a wheel secured upon the shaft outwardly of the casing for the valve, an indicator carried by the wheel, and means formed on the casing of the valve for indicating the relation of the valve to the seat and for limiting the rotation of the wheel.

2. In a device of the class described, a valve casing formed with a plurality of concentrically arranged indicating projections and a plurality of stops, a shaft secured to the casing, a wheel fixed upon the shaft, the said wheel being formed with a recess, an indicator provided with a shouldered extension secured in the recess in the wheel, and a valve.

In testimony whereof I affix my signature in presence of two witnesses.

EPHRAIM ANDREWS MIDGLEY.

Witnesses:
R. A. OGLESBY,
J. W. BOND.